(12) United States Patent
Parsons et al.

(10) Patent No.: US 7,031,437 B1
(45) Date of Patent: Apr. 18, 2006

(54) METHOD AND SYSTEM FOR PROVIDING REMOTE ACCESS TO PREVIOUSLY TRANSMITTED ENTERPRISE MESSAGES

(75) Inventors: Eric W. Parsons, Ashton (CA); Steven M. Armstrong, Nepean (CA); Helene Saint-Amour, Ottawa (CA)

(73) Assignee: Nortel Networks Limited, (CA)

( * ) Notice: Subject to any disclaimer, the term of this patent is extended or adjusted under 35 U.S.C. 154(b) by 184 days.

(21) Appl. No.: 09/753,345

(22) Filed: Dec. 29, 2000

Related U.S. Application Data

(60) Provisional application No. 60/244,986, filed on Oct. 30, 2000.

(51) Int. Cl.
*A04M 11/00* (2006.01)

(52) U.S. Cl. .............................. 379/88.12; 379/88.18; 379/88.22; 455/412.2; 455/567; 709/202; 709/224; 340/7.5

(58) Field of Classification Search ............. 379/88.18, 379/88.22, 88.12, 202.01; 713/168; 370/352, 370/353; 455/412.2, 567, 458, 406, 456.1; 340/7.5; 709/219
See application file for complete search history.

(56) References Cited

U.S. PATENT DOCUMENTS

| | | | | |
|---|---|---|---|---|
| 4,602,129 A | * | 7/1986 | Matthews et al. | 379/88.26 |
| 5,608,786 A | * | 3/1997 | Gordon | 370/352 |
| 6,061,570 A | * | 5/2000 | Janow | 455/458 |
| 6,094,681 A | * | 7/2000 | Shaffer et al. | 709/224 |
| 6,275,575 B1 | * | 8/2001 | Wu | 379/202.01 |
| 6,333,973 B1 | * | 12/2001 | Smith et al. | 379/88.12 |
| 6,336,137 B1 | * | 1/2002 | Lee et al. | 709/219 |
| 6,424,841 B1 | * | 7/2002 | Gustafsson | 455/466 |
| 6,459,913 B1 | * | 10/2002 | Cloutier | 455/567 |
| 6,473,609 B1 | * | 10/2002 | Schwartz et al. | 455/406 |
| 6,564,321 B1 | * | 5/2003 | Bobo, II | 713/168 |
| 6,628,194 B1 | * | 9/2003 | Hellebust et al. | 340/7.5 |

* cited by examiner

*Primary Examiner*—Fan Tsang
*Assistant Examiner*—Md. Shafiul Alam Elahee
(74) *Attorney, Agent, or Firm*—Steubing McGuinness & Manaras LLP

(57) ABSTRACT

In one example of the invention, a notification system is coupled to a plurality of message services including a voice mail server, an email server and an information server in an office. Messages left for a user (e.g. voice mail, email, CRM event, etc.) are deposited in folders maintained by the messaging services. The notification system detects additions to the user's folders and when a new message arrives, the notification system sends an alert to a Wireless Access Protocol (WAP) enabled device (e.g. cell phone) configured for the user. The alert includes the total number of messages of each type received for the user, along with an indication of the most recently received message. Message information associated with the alerts are also archived by the notification system so that a user can remotely access the information so as to learn more about the messages received from the plurality of message services.

16 Claims, 4 Drawing Sheets

METHOD AND SYSTEM FOR PROVIDING REMOTE ACCESS TO PREVIOUSLY TRANSMITTED ENTERPRISE MESSAGES

CROSS-REFERENCE TO RELATED APPLICATIONS

The present application is based on, and claims priority from, U.S. Appln. No. 60/244,986, filed Oct. 30, 2000 and entitled, METHOD AND SYSTEM FOR PROVIDING REMOTE ACCESS TO PREVIOUSLY TRANSMITTED ENTERPRISE MESSAGES, commonly owned by the present assignee, the contents of which are incorporated herein by reference.

The present application is related to U.S. applications No. 60/244,233 entitled METHOD AND SYSTEM FOR PROVIDING UNIFIED COMMUNICATION MANAGEMENT BASED ON PRESENCE INFORMATION, No. 60/244,392 entitled METHOD AND APPARATUS FOR MANAGING COMMUNICATIONS BASED ON CALLER IDENTIFICATION AND CATEGORIZATION, No. 60/244,988 entitled METHOD AND SYSTEM FOR PROVIDING ENTERPRISE MESSAGE NOTIFICATION TO A REMOTE DEVICE WITH RESPONSE ENABLEMENT, No. 60/244,987 entitled METHOD AND SYSTEM FOR PROVIDING UNIFIED WAP ALERTS and No. 60/244,985 entitled METHOD AND SYSTEM FOR PROVIDING SELECTIVE ACCESS TO ENTERPRISE MESSAGES FROM A REMOTE DEVICE, all filed Dec. 29, 2000 and commonly owned by the assignee of the present invention, the contents of each being fully incorporated herein by reference.

FIELD OF THE INVENTION

This invention relates generally to personal communications and messaging, and more particularly, to a system and method for providing a unified remote access to various types of new message and communication events associated with a user in an enterprise.

BACKGROUND OF THE INVENTION

Private Branch Exchanges (PBXs) and voice mail systems are ubiquitous in offices around the world. Their capabilities for providing message indicators are, however, rigidly fixed and quite limited. For example, a typical PBX system may provide some indicator, such as a flashing message on an LCD panel on the user's phone, that a new voice mail has been left in the user's mailbox. However, the user must be present in the office to see this indicator. Similarly, voice mail systems may provide an indication of how many unheard voice mails are in the user's mailbox. However, the user must call the voice mail system to get this indication.

As workers become more mobile, and as the number and types of messaging and communication options expand (e.g. email, voice mail, faxes, pagers, cell phones, wireless personal data assistants (PDA's) (e.g. RIM Blackberry, Palm Pilot, etc.), such conventional message indicators are becoming increasingly unsatisfactory. Further, the number and types of messages and information that a user can receive continues to expand (e.g. pages delivered to pagers, SMS (short message service) messages delivered to digital cellular phones, net alerts delivered to web-enabled (i.e. WAP) cell phones, instant messages delivered to desktop IM systems such as AIM or ICQ, stock values, sports scores, news updates, etc.) A related issue is that there is no central repository, or archive, where these messages, or a filtered subset of these messages, can be stored for future reference. By and large, these messages are delivered to individual devices (or applications in the case of desktop IM), and then can only be managed from that device/application.

SUMMARY OF THE INVENTION

The present invention relates to a method and system for unified and personalized call and message notification.

In one example of the invention, a notification system is coupled to a plurality of message services including a voice mail server, an email server and an information server in an office. Messages left for a user (e.g. voice mail, email, CRM event, etc.) are deposited in folders maintained by the messaging services. The notification system detects additions to the user's folders and when a new message arrives, the notification system sends an alert to a Wireless Access Protocol (WAP) enabled device (e.g. cell phone) configured for the user. The alert includes the total number of messages of each type received for the user, along with an indication of the most recently received message. Message information associated with the alerts are also archived by the notification system so that a user can remotely access the information so as to learn more about the messages received from the plurality of message services.

In accordance with one aspect of the invention, a method for managing message events associated with a plurality of message feeds provided to a user in a communication system, the method includes collecting information regarding message events associated with each of the message feeds, updating a list of messages for the user based on the collected information, preparing an alert based on the updated list of messages, pushing the alert to a wireless device associated with the user, and archiving information associated with the updated list of messages.

In accordance with another aspect of the invention, an apparatus for providing notifications about messages in a communication system including a first messaging server adapted to store messages from a first message feed for a plurality of users and a second messaging server adapted to store messages from a second message feed for the plurality of users, the first message feed and the second message feed being associated with different types of messages comprises a notification server adapted to be coupled to both of the first and second messaging servers, the notification server collecting information about the messages stored for certain of the plurality of users, the notification server being adapted to push alerts based on the collected information to wireless devices associated with the certain users, and an archive coupled to the notification server for storing message headers based on the collected information, the pushed alerts including a link for accessing the archive.

BRIEF DESCRIPTION OF THE DRAWINGS

The present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
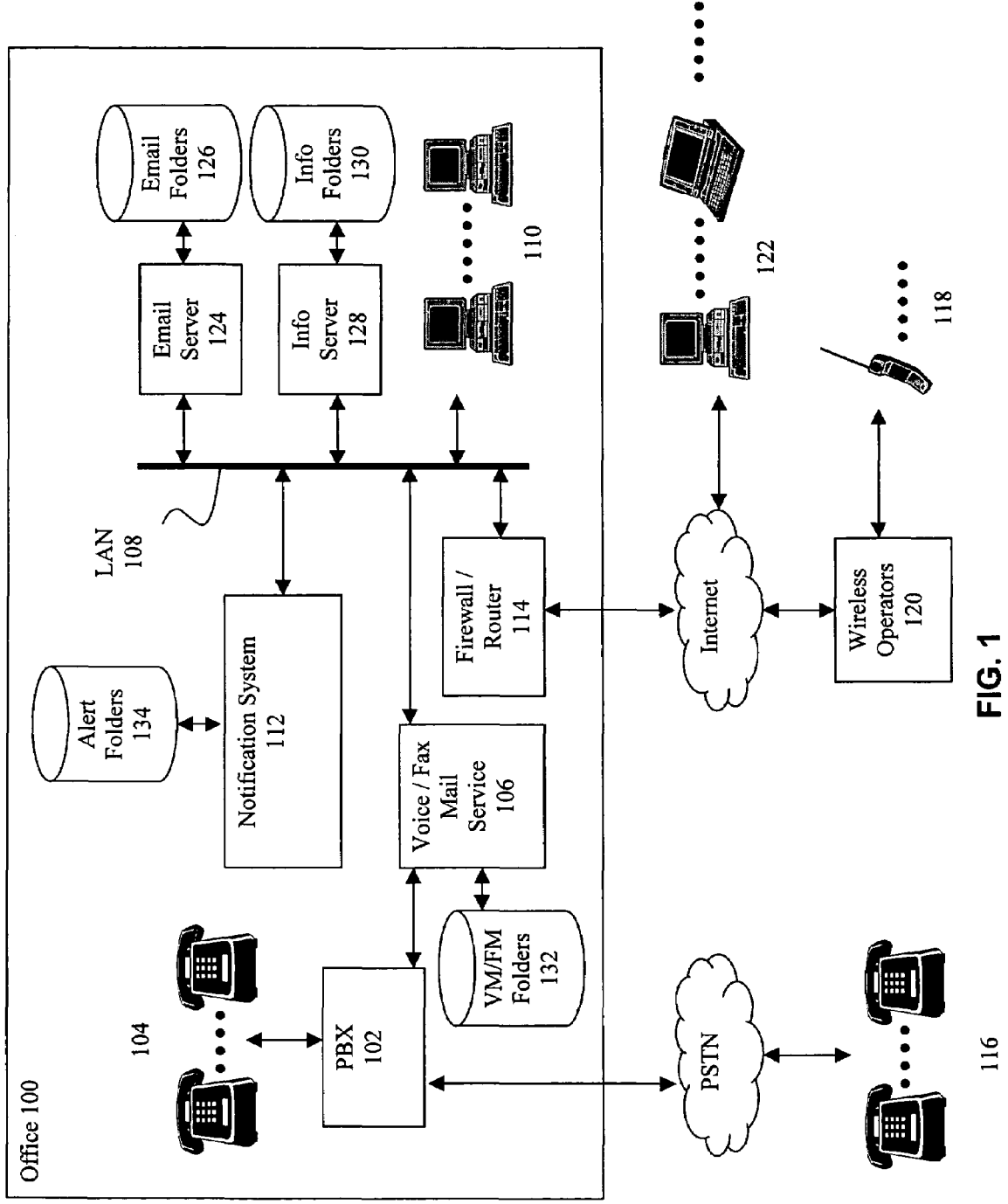
FIG. 1 illustrates an example topology for an implementation of the present invention in accordance with one embodiment.

FIG. 1 illustrates an example topology for an implementation of the present invention in accordance with one embodiment.

As can be seen, an office 100 (i.e. an enterprise) includes a PBX 102 that connects a plurality of office phones 104 and a voice mail/fax mail (VM/FM) service 106. The PBX 102 can be, for example, a Meridian 1™ PBX switch from Nortel Networks. The VM/FM service 106 can be, for example, a CallPilot™ messaging system from Nortel Networks. In one example, VM/FM service 106 maintains voice and/or fax mailboxes in folders 132 for each of the phones 104, which mailboxes may be identified with the same phone numbers associated with phones 104 (e.g. a 4 or 5 digit extension), and includes an Interactive Voice Response system (IVR) for interacting with, and thereby allowing callers to record and play messages to and from the mailboxes. VM/FM service 106 is coupled to PBX 102 for receiving and handling phone calls from within and outside the office 100 via its IVR.

Office 100 further includes a local area network (LAN) 108 (such as an Ethernet LAN) that connects a plurality of office PCs 110 with an email server 124 (such as a Microsoft Exchange Server) and an information server 128 (e.g. a Clarify server that is adapted to maintain customer relation management (CRM) information folders 130 in accordance with rules configured by associated users). PCs 110 can include email client functionality such as Microsoft Outlook for receiving, storing and manipulating information in email folders 126 and information folders 130 via LAN 108. The notification system 112 is coupled to the LAN 108, as is VM/FM service 106. Notification system 112 maintains and provides access to archived notification messages in alert folders 134.

The office 100 is coupled to the Public Switched Telephone Network (PSTN) via the PBX 102 and to the Internet via a firewall/router 114 (both connections may be accomplished using a common collection of lines, for example, as should be apparent to those skilled in the art). The office 100 is connected to a plurality of PSTN phones 116 via the PSTN and a plurality of Internet appliances 122 (e.g. a PC, laptop, handheld or other wired device having browser functionality for communicating with remote devices using conventional protocols such as HTTP) via the Internet. The office 100 is also connected via the Internet for providing text messages to a plurality of wireless devices 118 (e.g. one-way and two-way pagers, WAP and/or SMS-enabled cell phones and PDAs, etc.) via their wireless operators 120 (using protocols such as HTTP and SMTP, etc.). Preferably, the firewall/router 114 includes security extensions for providing secure access between the notification system 112 and wireless operators 120 via the Internet.

Generally, the present invention allows a user having a variety of communication, information and messaging feeds within the office environment (e.g. voice mail, email, fax, text messages, CRM events, etc.) to receive unified alerts notifying the user of newly received messages via these feeds on their WAP-enabled device such as a cell phone. The notification system 112 keeps track of the various types of new messages the user has received (perhaps filtered by user preferences about which types of messages to be notified about), and when a new message arrives, an updated total is sent to the user's WAP-enabled device using a notation such as "e-M (3e, 2v*, 1f, 2t, 3c, 1m) [John Smith]." This notation indicates that the user has received 3 emails, 2 voice mails, 1 fax, 2 text messages, 3 CRM events and 1 missed telephone call. The asterisk next to the voice mail total indicates that the voice mail is the most recent feed, and the sender of the new voice mail is John Smith. The notification system 112 further archives information about the messages for which unified alerts were issued, and provides remote access to the archived information via standard interfaces such as Internet Message Access Protocol (IMAP) and Post Office Protocol (POP).

It should be noted that not all of the "office" components shown in FIG. 1 need be included in the invention, nor need they be located at the same physical site. For example, the components may be located in different buildings. Other configurations may include shared or "virtual" PBX functionality that is available to different customers, who may or may not be located in the same office space, or no PBX functionality at all.

It should be further noted that certain types of message feeds may be omitted or added, and that the invention is not limited to the illustrated selection of voice mail, fax mail, email, and information message feeds. For example, the invention may include notification of text message feeds, such as the short text messages described in co-pending U.S. application Ser. No. 09/753,340.

Moreover, although the above describes an example implementation in which a common server and set of folders is provided for both voice mails and fax mails, the invention is not so limited and such types of message feeds may be maintained separately and/or alternatively.

Figure 2:
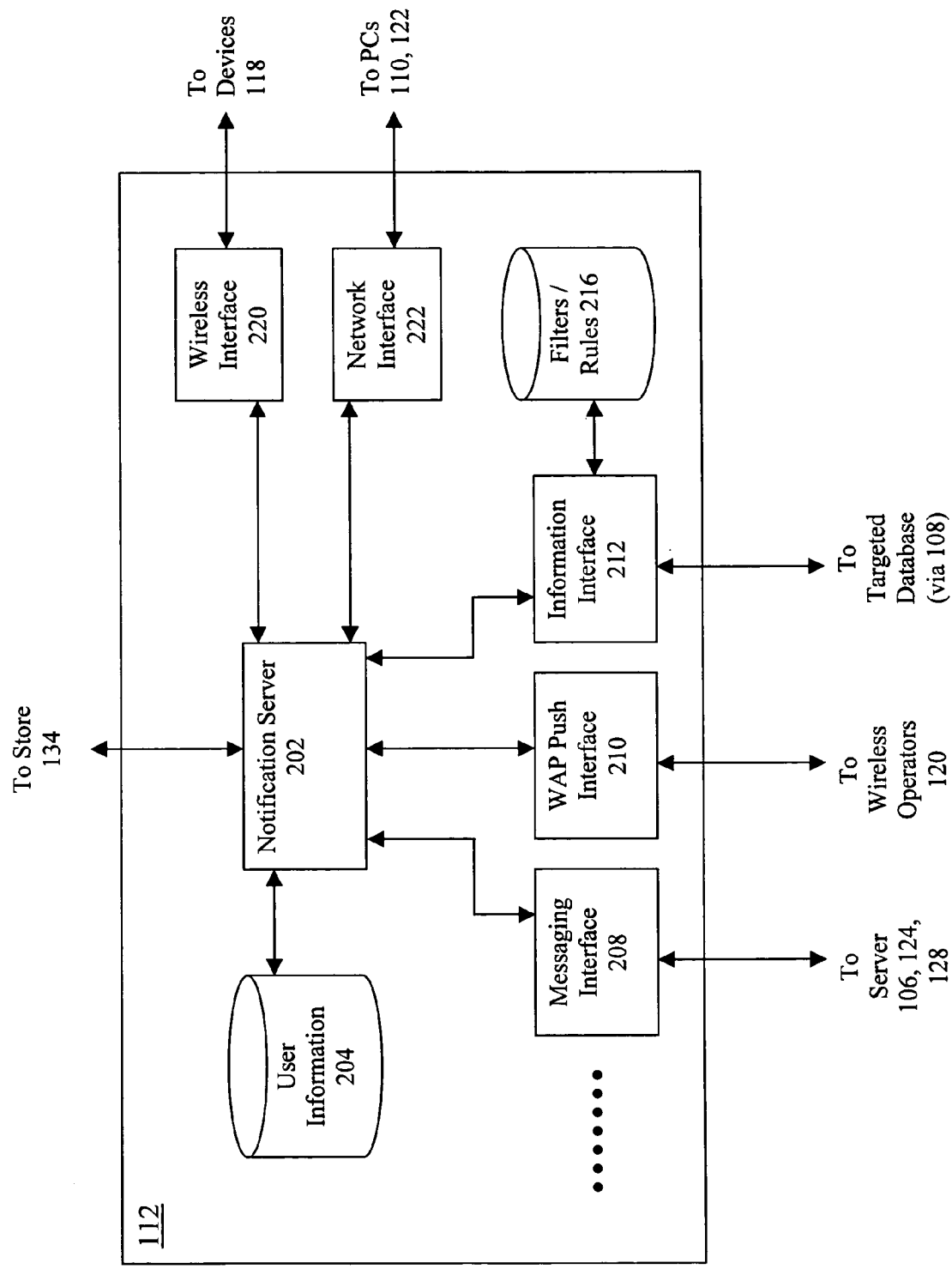
FIG. 2 illustrates an example of a notification system in accordance with an embodiment of the invention as illustrated in FIG. 1 in more detail.

FIG. 2 illustrates an example of a notification system in accordance with an embodiment of the invention in more detail. It should be noted that various alternatives to the system described below may exist, which alternatives may include fewer or additional components.

As shown in FIG. 2, a notification system 112 includes a notification server 202, a user information store 204, a messaging interface 208, a WAP Push interface 210, an information server interface 212, a wireless interface 220 and a network interface 222.

In one example of the invention, the components of the notification system illustrated in FIG. 2 are commonly provided in a Windows NT server (e.g. a Compaq ProLiant series server computer running Windows NT 4.0), with certain of the components provided as add-in cards and certain other of the components provided as software modules, or combinations thereof. It should be noted that, although shown separately for clarity of the invention, the user information store and the message information store can be commonly provided in a relational database such as a Sybase SQL database. It should be further noted that other types of server platforms are possible.

As indicated in FIG. 2, there can be additional interfaces from which message feeds are received and the invention is not limited to the example interfaces 208, 210, 212 provided in FIG. 2. It should be further noted that the system can include administrator interface functionality and administrative information storage for providing underlying configurations that are used by the notification system, which configurations may or may not include information stored in user information store 204 (e.g. user names, associated desk phone numbers, associated mailbox numbers, desktop PC addresses, etc.) and wireless operator information (e.g. URLs to HTTP servers or e-mail servers associated with the operators, CLID unblocking information, etc.).

Generally, the notification server 202 subscribes to and listens for published message events from VM/FM service 106, email server 124 and information server 128 via messaging interface 208 and information interface 212 to learn about new messages, CRM events and/or missed phone calls directed to users of the notification system (as listed in user information store 204). The notification server 202 uses these message events to update message information in alert folders 134, and to cause the WAP Push interface 210 to send an updated notification alert to the user's WAP-enabled wireless device. It should be noted that, although the invention will be described in more detail below with reference to an example where an alert to the user is triggered by a change in the total number of messages in store 134, that there are many other alternatives. For example, an alert can be triggered under user configurable circumstances (e.g. a predetermined period of time) and/or a change in the status of a wireless device associated with the user.

User information in store 204 can include the user's office phone and/or mailbox number (e.g. a four or five digit extension), the types of message feeds the user receives in the office (e.g. voice mail, fax, email, information, etc.), the paths to where those messages are stored in the office (e.g. the paths to VM/FM folders 132 maintained by VM/FM service 106, the paths to email folders 126 maintained by server 124, and the paths to information folders 130 maintained by server 128), the phone numbers/addresses of the user's WAP-enabled wireless devices and information concerning the wireless operators for any of the wireless devices. It should be noted that the user may configure more than one device for receiving alerts, in which case the notification server 202 should include user interface functionality (e.g. an HTTP server for communicating with a user's browser via the LAN 108 or the Internet) for dynamically configuring or changing configurations of devices, and for allowing the user to select between the different devices, as well as the user's current indication of whether to receive alerts via any of the devices. It should be further noted that wireless protocols and associated wireless devices other than those that support the WAP Push protocol may be used in accordance with the invention. Generally, equivalent protocols supporting standard formats and push-type technology are preferred.

The information in store 204 can further include an indication of the user's status and/or whether or not the user is presently interested in receiving message notifications. Moreover, the information in store 204 can include filters for determining what types of messages the user is interested in receiving alerts about. These filters can be based on the type of message (e.g. notify about emails and voice mails, but don't notify about faxes), and/or the identity of the sender of the message, and/or the contents of the message (e.g. keywords in the subject line, or a priority flag in the message). In this event, the notification server 202 can also include user interface functionality (e.g. an HTTP server for communicating with a user's browser via the LAN 108 of the Internet, programmed buttons on a desk phone for signaling to a client application in the LAN 108, etc.) for allowing the user to configure and/or change their message notification filters, preferences and/or notification status. Additionally or alternatively, the change in preferences and/or notification status can be performed in conjunction with a change in presence context, such as that described in co-pending U.S. application Ser. No. 09/753,340.

Message information in store 134 can include a list of all missed messages and/or phone calls for each user. The list includes header information about the messages and/or phone calls, such as sender information, length of message, time date received, etc. Notification server 202 continually updates this information in response to events forwarded from messaging interface 208 and information interface 212, as will be described in more detail below. Although in this example of the invention, store 134 includes a list of all missed messages and/or phone calls associated with the user, that this is not necessary. For example, store 134 can contain an archive copy of only header information concerning the messages about which the user has been notified via a WAP alert, for example. In such an example, a separate store may be provided that is accessible only to notification server 202 and which contains a list of all messages, whether the user has been notified about them or not.

Messaging interface 208 communicates with VM/FM service 106 and email server 124 via the LAN 108 and an interface such as Microsoft's Messaging Application Programming Interface (MAPI)/Collaboration Data Objects (CDO) interface and/or non-proprietary interfaces such as the Internet Message Access Protocol (IMAP). The messaging interface 208 uses the folder names received from the notification server 202 (and user information store 204) to subscribe to and/or listen for changes in the contents of the corresponding folders which indicate that a message has been deposited, read and/or deleted in the folders by VM/FM service 106, email server 124 and/or information server 128. Accordingly, when a user receives or deletes voice mails, faxes, and emails, the messaging interface 208 learns about them and forwards the information to notification server 202. Further, if the messages include fields for the sender, this information can be provided to the notification server 202 as well.

If a new message is received, notification server 202 can use the received information and message from interface 208 to compare against filters established by the user to determine whether a new alert should be sent. If an old message is deleted or read, notification server 202 can use the received information from interface 208 to compare against the list of messages in message information store 134 to determine whether an updated total is required. For example, if the deleted or read message is one that the user was not notified about previously, then an updated total is not required. If an updated total is required, then the list of messages for the user in message information store 134 is updated. For example, if a message is one that the user was notified about (e.g. a priority email), and if the user has read the message (e.g. from a desktop or remote email client application), then the message should be removed from the user's list in information store 134. Generally, however, a new alert is not sent to the user upon a decrease in the total number of messages received (and perhaps unread) for the user. Rather, if at all, this information is provided in a "background" alert that will be explained in more detail below.

In one example of the invention, the VM/FM service 106 is configured with functionality for further generating message events associated with incoming calls which are not successfully completed (e.g. calls that are directed to be answered by the voice mail system, but the caller hangs up before leaving a message). Accordingly, notification server 202 can learn about this missed call information from VM/FM service 106 via messaging interface 208. If the PBX 102 further includes caller ID (CLID) functionality, the phone number of the missed incoming caller can also be provided by messaging interface 208 to the notification server 202. It should be noted that there are many alternatives to the example of VM/FM service 106 providing missed call information, and so the invention is not limited by the foregoing illustrations. For example, missed call information can be additionally or alternatively provided by a client application residing in PBX 102 or similar call control facility.

Information interface 212 checks information in a targeted database for new items of interest to the user in accordance with filters and rules established in store 216. For example, the user may wish to receive an alert when a stock price reaches a certain level, or when a new company product price quote is set, or when a traffic advisory is sent. Accordingly, information interface 212 contains all necessary functionality for searching a database having a path supplied to it by notification server 202 and to compare retrieved information with rules provided in store 216 for the requesting user. For example, the targeted information path may be a URL or a CGI script to a website that the user has configured in user information store 204 (e.g. a financial website that provides stock quotes or sports scores). Information interface 212 can then include HTTP client functionality for posting the URL or CGI script to the website and receiving the response (e.g. a recent stock quote for a particular company or sports score for a particular sports team). Information interface 212 can then search the response pages returned by the website and compare the received response against the rules provided in store 216 (e.g. a stock price exceeds or falls below given thresholds, or a non-zero sports score for a sports team). It should be noted that the targeted information sources and associated rules (e.g. certain pre-set financial or sports websites or CRM databases) may be pre-configured by the system so that information interface 212 can be pre-programmed to know how to find the requested information. Such pre-configuration can be built into user interface functionality that is provided for allowing users to specify desired information alerts and to save such selections in user information store 204 and/or rules/filters store 216.

It should be apparent that there are many alternatives and examples of information targets that may be searched. For example, the information interface 212 can be configured to intercept alerts or events sent to a user via LAN 108 by external systems, which alerts or events may or may not need to be filtered. Such alerts or events can include instant messages delivered to the user's desktop system in LAN 108 by such applications as AIM or ICQ, for example, or from automated services that have been subscribed to by the user such as stock quote services, sports score services, news services, etc.

The information in store 216 can include the target information source that should be examined (e.g. stock quote website, company product list database, etc.), and the rules for determining when a message should be sent to the user (e.g. stock price or product identifier). It should be apparent that the information interface 212 can include user interface functionality (e.g. an HTTP server for communicating with a user's browser via the LAN 108 or the Internet) for allowing the user to configure the rules in store 216, or this functionality can be included in other modules outside or within the notification system, including notification server 202.

It should be noted that certain types of information feeds may be handled either by messaging interface 208 or information interface 212, depending, for example, on whether the type of information feed is a "raw" feed or a "targeted" feed. For example, in an implementation where information server 128 itself is configured with "front-end" rules for filtering information for users before depositing the information in folders 130, the feed may be considered a "targeted" feed that does not require any additional filtering beyond the alert "delivery" filters described above. Moreover, if such a server maintains substantially the same folder structure and interface as an email server 124, the functionality for learning about such information events can be included in messaging interface 208. Similarly, where information interface 212 acts to intercept "raw" information events and then to apply "interest" filters (e.g. stock tickers or sports scores as described in the examples above), then information interface 212 and filters/rules 216 provide "front-end" filtering functionality for generating information message events for only a filtered subset of the "raw" information events, which "raw" events can be further filtered by alert "delivery" preferences specified by the user as described above.

Wireless interface 220 includes server functionality for interacting with clients in wireless devices 118 (e.g. using WML pages exchanged over HTTP protocol between system 112 and wireless operators 120 via the Internet, and then exchanged over WTP protocol between the wireless operators 120 and the wireless devices 118). Such server-client functionality can include the ability to request and display the user's message header information from store 134 via server 202.

Network interface 222 may include similar server functionality such as that discussed above in connection with wireless interface 220 for interacting with clients in PCs 110 (e.g. using HTML pages over a HTTP protocol). Additionally or alternatively, network interface 222 may merely provide a standard messaging interface such as IMAP/POP so that email clients (e.g. Microsoft Outlook) in PCs 110 and/or can access associated user information in store 134 in folder fashion.

WAP Push interface 210 causes the message alert to the user's wireless device via an Internet gateway for the wireless operator associated with the specified wireless device (e.g. the user's WAP-enabled cell phone). In one example of the invention, the WAP Push interface 210 uses the WAP Push protocol, in which the messages are posted as XML/WML/HDML documents using an HTTP protocol in accordance with a document type definition (DTD). As should be apparent, in order to access these devices for messaging, the system needs to be configured to recognize and communicate with the associated wireless operator for transferring text messages. For example, the system may be configured with the Internet address of the operator through which text messages are received using an HTTP protocol. Users can be permitted to receive messages only with devices that are associated with these pre-configured operators. It should be further apparent that the wireless device may need to be preconfigured with functionality for understanding the Push feed and for displaying it on the device.

In accordance with an aspect of the present invention, the WAP alert message sent to the user's wireless device also includes a URL pointing to a script or servlet which, when selected by the user on the wireless device, initiates communication with the wireless interface 220. Such communication can then allow the user to access stored header information associated with the messages for which the user has received a notification.

It should be noted that WAP Push interface 210 preferably includes functionality for sending both "background" and "foreground" types of WAP Push feeds to the wireless device, which different types of feeds are well understood by those skilled in the art. For example, many types of wireless devices are configured to handle "background" and "foreground" types of WAP Push feeds differently, with "foreground" types of feeds typically having a higher probability of interrupting and receiving the attention of the wireless device user. In accordance with an aspect of the invention, notification server 202 and WAP Push interface 210 include functionality for sending certain types of alerts via "foreground" feeds and other types of alerts via "background" feeds. For example, notifications of newly received messages may be sent via "foreground" feeds, while notifications that messages have been read or deleted may be sent via "background" feeds. The delivery of the different feeds can be also set differently, for example with "foreground" feeds sent immediately and "background" feeds sent at specified intervals of time. It should be apparent that this selection of types of frequency of feeds may be pre-configured or may be changed via user preference, for example.

As set forth above, it should be further noted that wireless protocols and associated wireless devices other than those that support the WAP Push protocol may be used in accordance with the invention. Generally, equivalent protocols supporting standard formats and push-type technology are preferred.

Figure 3:
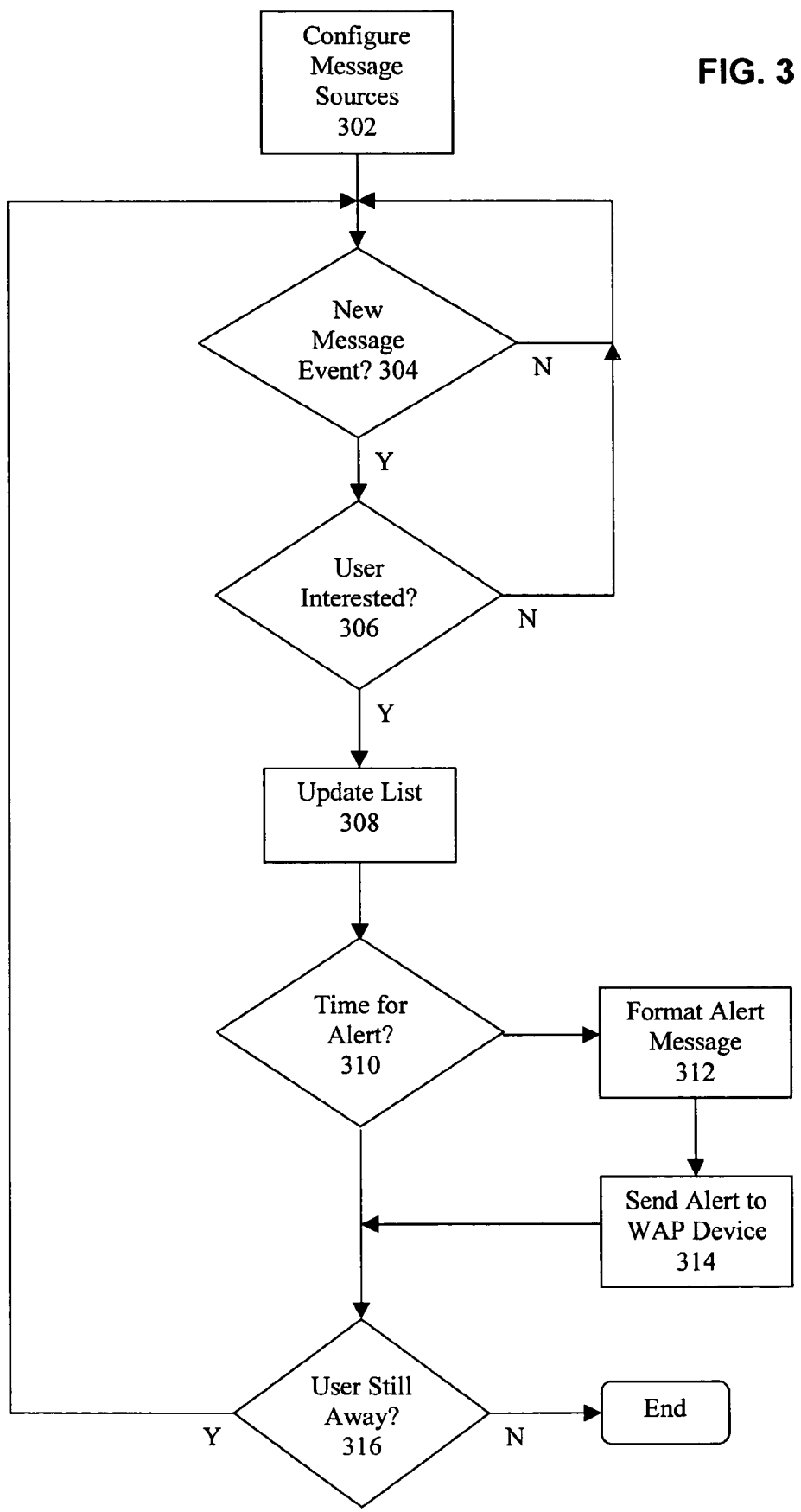
FIG. 3 is a flowchart illustrating an example method of providing WAP alerts of incoming messages and information events to a user of the notification system in accordance with one embodiment of the present invention.

FIG. 3 is a flowchart illustrating an example method of providing alerts to a user's configured wireless device of incoming messages or information events in accordance with an embodiment of the present invention. The flowchart below describes an example of processing that may be performed for a single user. However, it should be apparent that the present notification system includes functionality for simultaneously performing such processing for a plurality of users.

As shown in FIG. 3, processing begins in block 302 where the system retrieves the user information from store 204, and causes interfaces 208, 210 and 212 to listen for new message or call events associated with the user (e.g. voice mail, email, missed phone calls, information events, etc.). In one example, where message interfaces such as MAPI/CDO or IMAP are supported by servers 106, 124 and/or 128, this may involve providing the paths to the message folders maintained for the user to the interfaces, upon which the interfaces subscribe to the associated servers 106, 124, 128 for receiving event notifications for the specified folders. In another example, such as with "raw" information feeds monitored by information interface 212, this may involve configuring interface 212 with the targeted information source and a periodic interval with which to monitor the source for information that matches rules and filters established by the user.

Processing advances to block 304 where it is determined that a message event has been received by one of interfaces 208, 210 and/or 212 for the user (e.g. voice mail, email, missed phone call, information event, etc.). Information about the message and/or the entire message is sent to the notification server 202 for inspection to determine whether the message is one that the user is interested in receiving notifications about. This is performed in block 306. For example, for a new message notification server 202 compares the information and/or message with delivery preferences established by the user and stored in information store 204 (e.g. notify about new voice mails, but not emails; notify only about new messages from a certain caller/sender; notify only about priority messages, etc.) For a deleted or read message, notification server 202 may simply compare the information about the message with messages in a list maintained in message information store 134 to determine if this is a message that the user has already received a notification about. In either case, if the notification server determines that this is a message that the user is interested in receiving notification about, processing advances to block 308. Otherwise, processing returns to block 304 until a new message event is received.

In block 308, the user's list of messages is updated. In other words, if the message is a new message, it is added to the user's list. If the message has been deleted or read, the message is removed from the list. Processing continues to block 310, where it is determined whether it is an appropriate time to send an alert to the user. For example, the system may be pre-configured or dynamically configured by the user to only send messages at certain time intervals (e.g. 15 minutes), so that the user will not be overwhelmed by alerts. Additionally or alternatively, the system may be configured to only forward alerts when new messages are received.

If it is an appropriate time to send an alert to the user's device, processing advances to block 312 where an alert message is prepared. In one example of the invention, the message to be displayed on the user's WAP-enabled device takes the form of "e-M (3e, 2v*, 1f, 2t, 3c, 1m) [John Smith]." This notation indicates that the user's list in store 134 indicates that the user has received 3 emails, 2 voice mails, 1 fax, 2 text messages, 3 CRM events and 1 missed telephone call that are of interest to the user (perhaps only those that have not yet been read or acknowledged by the user). The asterisk next to the voice mail total indicates that the voice mail is the most recent feed, and the sender of the new voice mail is John Smith. The notification server thus prepares a WAP Push message that will cause the above type of message to be displayed based on the updated list of messages for the user. It should be noted that this type of message contains very few characters so that it can be displayed on a wide variety of devices, such as cell phones, that have a limited display capability. It should be further noted that the number of message feeds indicated by the alert can be pre-configured by all users or may be tailored for each user in accordance with their alert preferences (e.g. the user may only wish to be notified about voice mails and emails, but not faxes). As discussed above, in accordance with an aspect of the present invention, the WAP alert message sent to the user's wireless device also includes a URL pointing to a script or servlet which, when selected by the user on the wireless device, initiates communication with the wireless interface 220 so as to allow the user to access stored header information associated with the messages for which the user has received a notification.

Processing advances to block 314, where the alert message is forwarded to the user's WAP-enabled device. This block can include retrieving the user's device configuration and carrier settings from user information store 204 and providing this information to the WAP Push interface 210. In one example of the invention, WAP push protocol is used to send the message to the user's wireless device. This includes posting XML encoded documents using HTTP protocol. It should be apparent that other alternatives are possible. This block can further include processing to determine whether to send the alert via a "foreground" feed versus a "background" feed (e.g. send alerts containing new messages via "foreground" feeds, but send alerts with no new messages via "background" feeds).

In an alternative example where information about messages for which the user has received notification is archived in a separate repository than the list of all messages maintained for each user, block 314 can include providing a copy of the header information associated with the messages in the separate repository.

After the message alert is sent, or if a message event was received but the time was not appropriate for sending an alert, processing advances to block 316, where it is determined whether the user still desires to receive message alerts. For example, the user may have returned to the office and has indicated to the notification system that he no longer desires message alerts to be sent. If the user does not wish to receive alerts any longer, processing ends. Otherwise processing returns to block 304.

Figure 4:
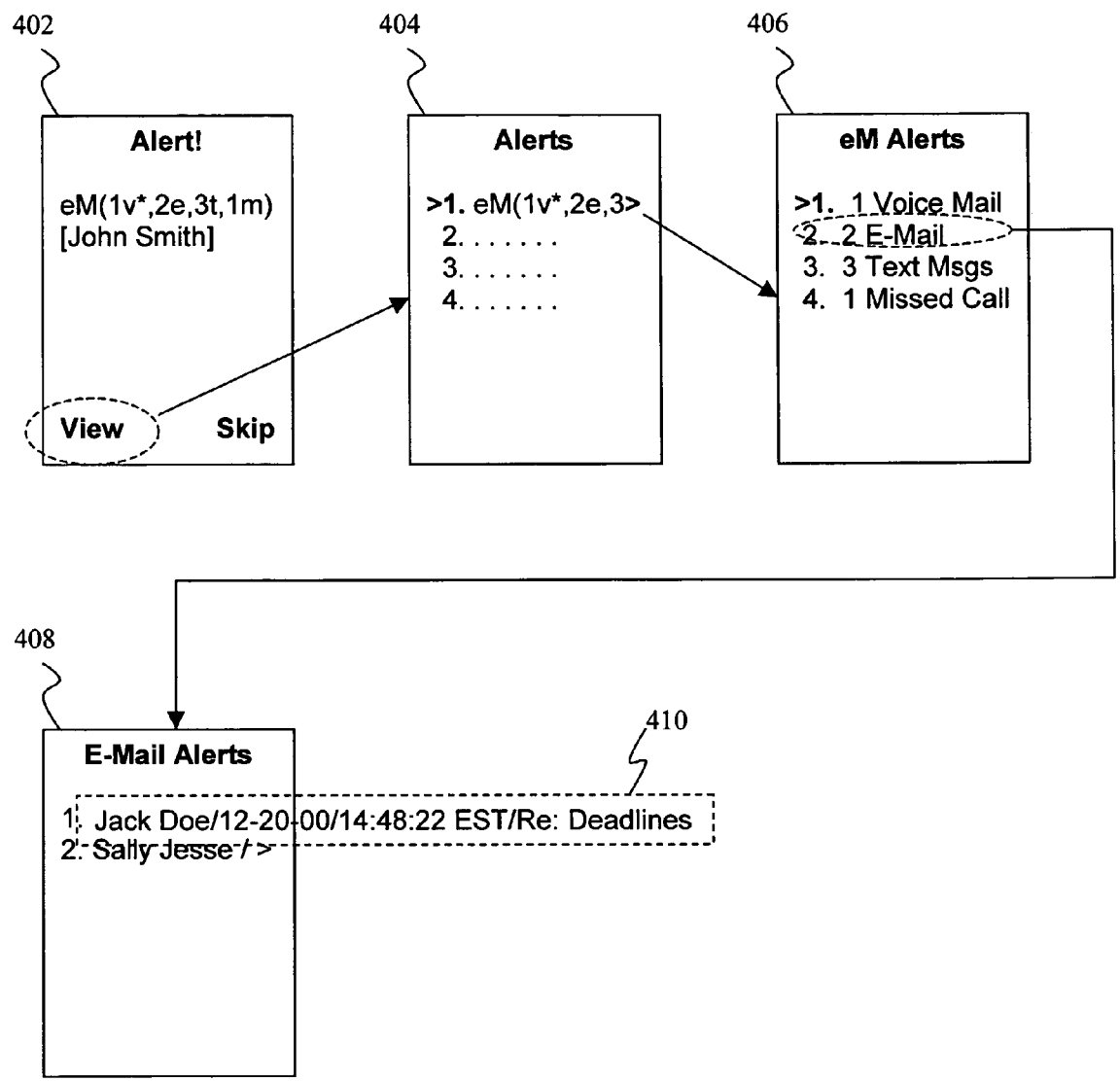
FIG. 4 illustrate screens that can be presented on a wireless device for the user so that the user can remotely access information about messages associated with WAP alerts in accordance with aspect of the present invention.

FIG. 4 illustrates example screens that can be presented on a wireless device in accordance with an embodiment of the present invention.

As shown in FIG. 4, when a WAP alert is sent to a wireless device associated with the user, a screen such as screen 402 may be presented. The format of the screen and the presentation of the alert may be device-dependent. For example, the alert may be accompanied by a beep from the device. However, the text of the alert as prepared by notification system 112 should be substantially as formatted by the system 112. In this example, the alert indicates that 1 voice mail, 2 emails, 3 text messages and 1 missed phone call have been received for the user, with a voice mail from John Smith being the most recently received message. Screen 404 may be presented when the user points to or otherwise selects the "View" button on screen 402. As shown in FIG. 4, screen 404 lists all the WAP alerts that have been received by the wireless device. This information is stored by the wireless device, and the presentation is device-dependent. However, in accordance with an aspect of the invention, associated with the WAP alert provided by notification system 112 is a URL pointing to a script for initiating communication between the wireless device and the wireless server interface of the notification system 112. Accordingly, when the user selects the option 1 on the wireless device in screen 404, the script executes. The script causes wireless interface 220 to retrieve message header information associated with the user from store 134 and to cause screen 406 to be sent to the wireless device. As shown, screen 406 includes items for each type of message feed associated with the user, along with the number of messages associated with each feed. The user can point to any of the items to retrieve more information. Accordingly, as shown in FIG. 4, if the user points to item 2, notification system 112 causes screen 408 to be displayed in response, which in this example, lists header information for emails received for the user. By pointing to item 1, and utilizing the wireless device's scroll capabilities, the full text of the header information for a corresponding email can be viewed, as indicated by box 410. In this example, the full text includes the email's sender name, date and time received, and a subject of the email.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. A method for managing message events associated with a plurality of message feeds provided to a user in a first communication network, the method comprising the steps of:
    collecting, in the first communication network, information regarding at least two message events associated with the message feeds;
    determining, based upon a predefined filter, whether to provide an alert associated with each message event;
    updating a list of messages for the user based on the collected, filtered information;
    preparing an alert based on the updated list of messages;
    pushing the alert, via a second communication network which is a shared network, to a wireless device associated with the user using a Wireless Access Protocol (WAP) push protocol without knowledge of topology of the second communication network, the alert including an indication of the most recent message event of the plurality of message events; and
    archiving information associated with the updated list of messages,
    whereby the alert is transmitted to the wireless device in the absence of a corresponding request from the wireless device, and whereby predetermined types of messages can be withheld in relative security in the first communication network.

2. A method according to claim 1, further comprising the steps of:
    providing a link in the pushed alert for accessing the archived information via a wireless interface.

3. A method according to claim 1, wherein the message feeds comprise two or more of voice mail, fax mail, email, and an information source.

4. A method according to claim 3, wherein the message events include one or more of a newly received voice mail, a deleted voice mail a read voice mail, a newly received email, a deleted email, a read email, a newly received fax, a deleted fax, a newly received information message, a deleted information message, a read information message, and a missed phone call.

5. A method according to claim 1, wherein the preparing step includes the step of preparing the indication of a most recent one of the message events.

6. A method according to claim 5, wherein the preparing step includes the step of preparing an identification of a caller associated with the most recent message event.

7. A method according to claim 1, wherein the preparing step includes the step of preparing a respective total of messages associated with each of the message feeds.

8. An apparatus for managing message events associated with a plurality of message feeds provided to a user in a communication network, the apparatus comprising:
- means in the first communication network for collecting information regarding at least two message events associated with the message feeds;
- means for determining, based upon a predefined filter, whether to provide an alert associated with each message event;
- means for updating a list of messages for the user based on the collected information;
- means for preparing an alert based on the updated list of messages, the alert including an indication of which of the plurality of message events is a most recent message event;
- means for pushing the alert, via a second communication network which is a shared network, to a wireless device associated with the user using a Wireless Access Protocol (WAP) push protocol without knowledge of topology of the second communication network; and
- means for archiving information associated with the updated list of message,
- whereby the alert is transmitted to the wireless device in the absence of a corresponding request from the wireless device, and whereby predetermined types of messages can be withheld in relative security in the first communication network.

9. An apparatus according to claim 8, further comprising:
- means for providing a link in the pushed alert for accessing the archived information via a wireless interface.

10. An apparatus according to claim 8, wherein the message feeds comprise two or more of voice mail, fax mail, email, and an information source.

11. An apparatus according to claim 10, wherein the message events include one or more of a newly received voice mail a deleted voice mail a read voice mail, a newly received email, a deleted email, a read email, a newly received fax, a deleted fax, a newly received information message, a deleted information message, a read information message, and a missed phone call.

12. An apparatus according to claim 8, wherein the preparing means includes means for preparing an identification of a caller associated with the most recent message event.

13. An apparatus according to claim 8, wherein the preparing means includes means for preparing a respective total of messages associated with each of the message feeds.

14. An apparatus for providing notifications about messages in a first communication network including a first messaging server adapted to store messages from a first message feed for a plurality of users and a second messaging server adapted to store messages from a second message feed for the plurality of users, the first message feed and second message feed being associated with different types of messages, the apparatus comprising:
- a notification server in the first communication network adapted to be coupled to both of the first and second messaging servers, the notification server collecting information about at least two messages stored for certain of the plurality of users by the first message feed and the second message feed, and applying a predefined filter to the message, and pushing alerts associated with messages not removed from processing by the filter via a second communication network which is a shared network, without knowledge of topology of the second communication network, using a Wireless Access Protocol (WAP) push protocol based on the collected information to wireless devices associated with the certain users;
- an archive coupled to the notification server for storing message headers based on the collected information, the pushed alerts including a link for accessing the archive and an indication of the most recent one of the plurality of messages;
- wherein the communication system further includes a PBX coupled to a plurality of office phones associated with the certain users, one of the first and second message feeds being voice mail associated with the office phones,
- whereby the alert is transmitted to the wireless device in the absence of a corresponding request from the wireless device, and whereby predetermined types of messages can be withheld in relative security in the first communication network.

15. An apparatus according to claim 14, further comprising:
- a wireless interface adapted to communicate with the wireless device in response to selection of the link included in the pushed alerts.

16. An apparatus according to claim 14, wherein the first message feed comprises one of a voice mail, fax mail, email, and an information source, and the second message feed comprises a different one of the voice mail, fax mail, email, and the information source.

* * * * *

UNITED STATES PATENT AND TRADEMARK OFFICE
CERTIFICATE OF CORRECTION

PATENT NO. : 7,031,437 B1
APPLICATION NO. : 09/753345
DATED : April 18, 2006
INVENTOR(S) : Parsons et al.

It is certified that error appears in the above-identified patent and that said Letters Patent is hereby corrected as shown below:

At column 13, line 3, <u>first</u> communication network, the apparatus ---

At column 13, line 22, updated list of [message] <u>messages,</u>

At column 13, line 36, voice mail<u>.</u> a deleted voice mail ---

At column 13, line 41, 12. An apparatus according to claim [8] <u>9</u>, ---
(This is according to examiner's Amendment)

Signed and Sealed this

Twenty-first Day of November, 2006

JON W. DUDAS
*Director of the United States Patent and Trademark Office*